INVENTORS
FRED J. PAULET, JR. &
DAVID GORDON
BY
ATTORNEYS

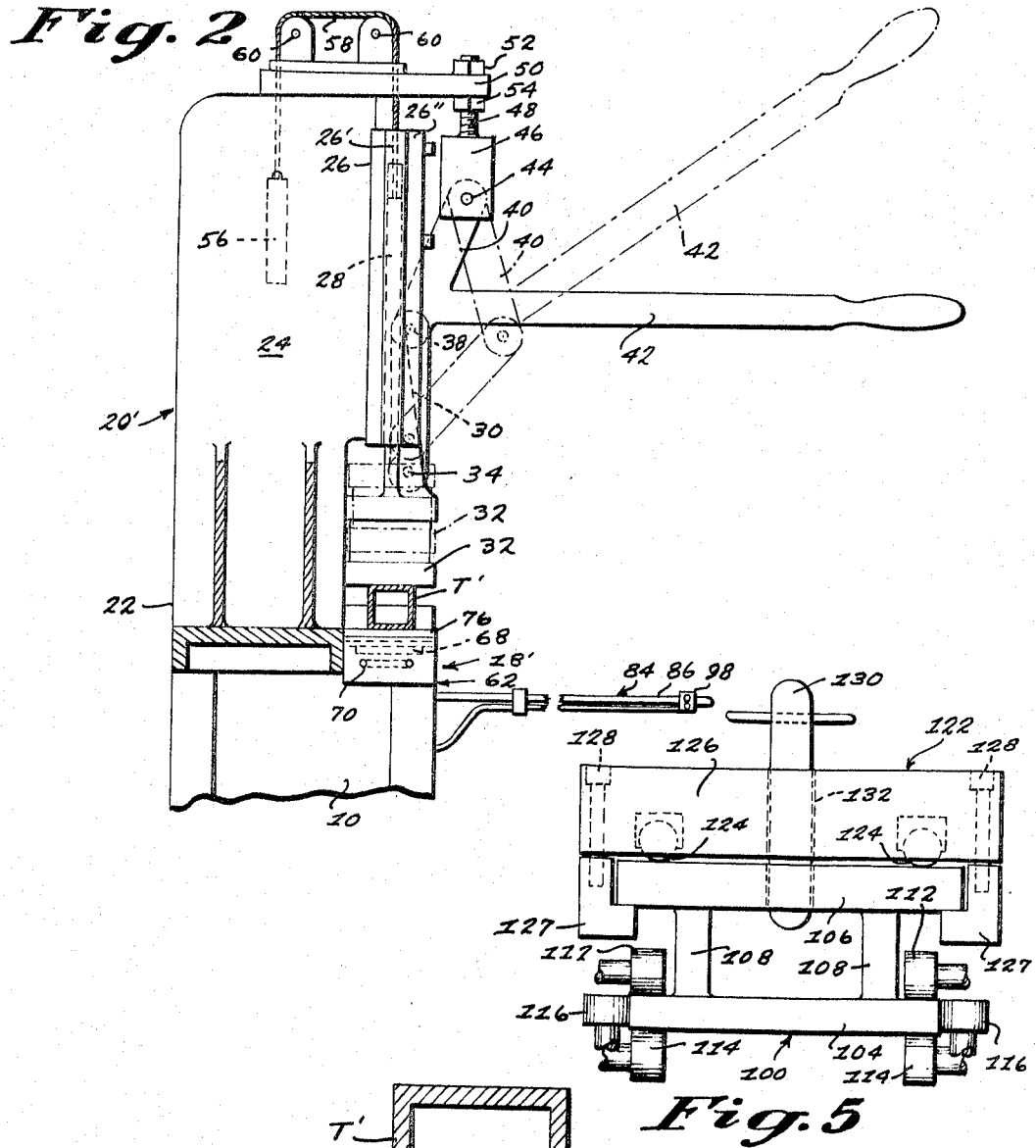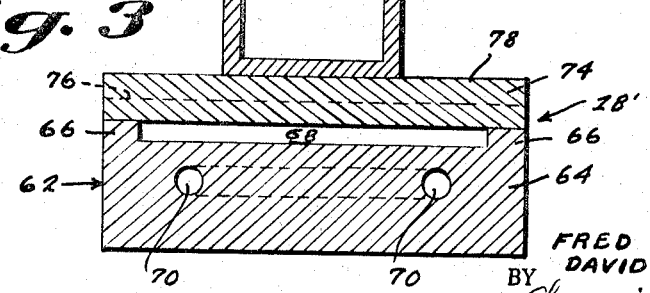

United States Patent Office 3,325,624
Patented June 13, 1967

3,325,624
METHOD AND APPARATUS FOR WELDING
RECTANGULAR TUBING
Fred J. Paulet, Jr., and David Gordon, Tampa, Fla.,
assignors, by mesne assignments, to Industrial Supply
Corporation, a corporation of Florida
Filed June 23, 1964, Ser. No. 377,306
7 Claims. (Cl. 219—104)

This invention relates generally to a method and apparatus for welding two pieces of rectangular carbon steel tubing endwise, and more particularly to a resistance butt welding operation by which the handling of such tubing for supplying practical market needs is facilitated to exceptional advantage.

Rectangular carbon steel tubing of varying cross-section is normally fabricated at a mill in substantial quantities and in a predetermined series of mill lengths generally ranging from 20 to 40 feet after which it is placed in warehouses or shipped to jobbers for warehousing and ultimate distribution to construction companies and other users. Because of the large space requirements of storing rectangular tubing and the large variety of available sizes and lengths of the tubing, it is economically impractical for a jobber to carry a full range of such tubing so that he regularly encounters considerable difficulty in promptly supplying the various needs of his customers. In addition, a particular construction project generally requires tubing of various lengths which do not correspond with the mill lengths and therefore requires the jobber or the mill to cut existing mill lengths to the prescribed sizes thereby leaving short pieces or "drops" which are normally treated as waste resulting in an increased cost factor.

In an effort to overcome these difficulties, various methods of welding "drops" and other pieces of rectangular tubing have been tried without success. For example, it was found that stick welding presented difficult alignment problems and was too arduous and time consuming; while conventional resistance butt welding methods, such as heretofore used for welding cylindrical tubing, were similarly unsuccessful because of the inability to obtain a uniform current flow through the tubing cross-section, which resulted in a non-uniform low-strength weld rendering the tubing section unfit for structural application.

The present invention provides a means of resistance butt welding rectangular tubing which is fast, economical, and results in a high-strength weld; and by which the jobber is able to meet effectively a large variety of demands for rectangular tubing from a relatively limited supply and at a reduced price by virtue of the highly flexible manner in which "drops" and tubing of other than mill lengths can be combined into practically any length.

According to the present invention, two pieces of rectangular tubing are aligned lengthwise with their facing end portions adjacent, an electric current is made to flow from one of the end portions to the other which is of sufficient magnitude to raise the temperature of the end portions to the plastic range and which is directed with respect to the rectangular cross-section of the adjacent end portions to distribute it with substantial uniformity through this cross-section to cause substantially uniform heating of the adjacent end portions, the electric current is discontinued when the temperature of the end portions reaches the plastic range, and a compressive force directed lengthwise of the pieces of tubing is applied thereto to upset the adjacent end portions.

These and other features of the present invention are described in detail below in connection with the accompanying drawings, in which:

FIG. 2 is a left side elevation of the apparatus taken substantially at line 2—2 in FIG. 1;

FIG. 3 is an enlarged sectional detail taken substantially at the line 3—3 in FIG. 1;

FIG. 5 is a related right side detail view illustrating the mounting for part of the movable portion illustrated in FIG. 4.

Figures 1, 4:
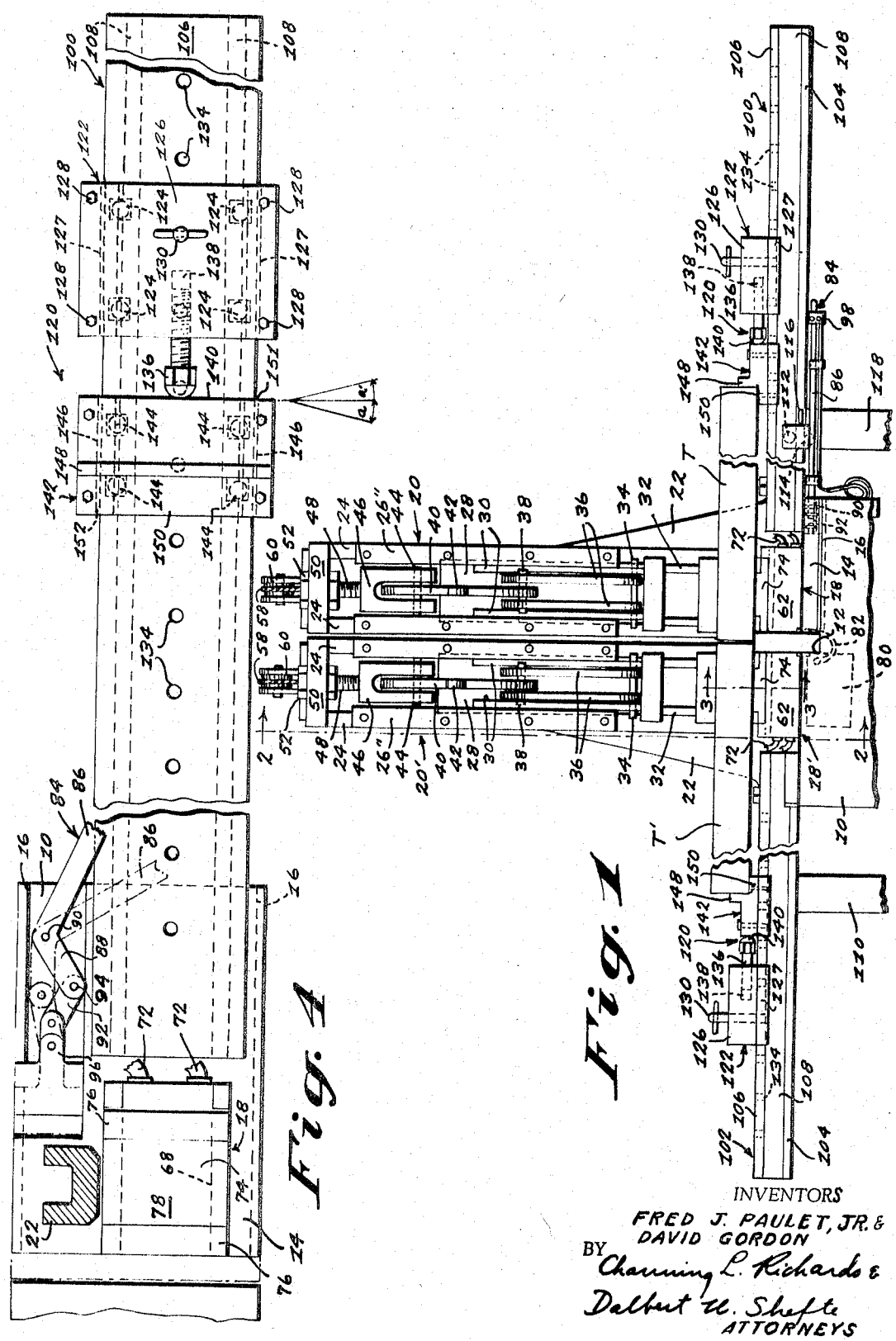
FIG. 1 is a partial front elevation of a welding apparatus embodying the present invention.
FIG. 4 is an enlarged plan detail view illustrating the movable portion of the apparatus illustrated in FIG. 1.

As shown in the drawings, the illustrated embodiment of the present invention comprises a stationary bed plate 10 having a stepped portion 12 on which a carriage member 14 is slidably mounted on tracks 16 for movement along the stepped portion 12. Bed plate 10 and carriage member 14 each have associated welding dies 18 and 18' to be described in further detail below, and upright structures generally indicated by reference numerals 20 and 20' which are identical and include a stanchion member 22 having parallel sides 24 which support at the front edge thereof stacked plates 26, 26' and 26" arranged to provide vertical grooves in which a slide member 28 is located for vertical reciprocation. Slide member 28 includes a pair of spaced triangular shaped members 30 depending outwardly therefrom and the bottom edges of slide member 28 and support member 30 are welded to the upper surface of clamping block 32; triangular members 30 also provide aligned bores for supporting the ends of a shaft member 34 which passes through the adjacent ends of a pair of links 36 disposed between members 30 and in parallel relation to each other. The other ends of links 36, in turn, support the shaft member 38 which passes through the adjacent end of a link portion 40 of handle piece 42 supported at its other end by shaft member 44 located in bracket member 46 whereby the links 36 and link portion 40 form a toggle linkage operated by the handle piece 42 to raise and lower the slide member 28 and clamping block 32 and to exert a force for pressing the associated piece of rectangular tubing (T or T') against the upper surface of the welding die (18 or 18') as shown in FIG. 2. Bracket member 46 has a screw 48 connected thereto which extends up through an opening in top plate 50 secured to the stanchion sides 24 and has nuts 52 and 54 by which the height of the bracket member can be adjusted to vary the lower position and effective force of clamping block 32 against the tubing. The raising of the clamping block 32 by handle piece 42 is made easier by providing a counterweight 56 located between stanchion sides 24 and connected to slide member 28 by a cable 58 passing over pulleys 60 mounted on top plate 48. A hydraulic motor arrangement could be used in place of the mechanical linkage if desired.

The welding dies 18 and 18' are identical and consist of a bifurcated member 62 (FIG. 3) which has a base portion 64 and leg portion 66 extending upwardly therefrom so that the upper ends thereof define a void 68 therebetween which extends parallel to the lengthwise extent of the tubing piece T; bored channels 70 are also provided in the base portion 64 to pass cooling water supplied by flexible tubing 72 through the dies 18 and 18'. A plate member 74 is connected across the ends of leg portions 66 in spaced relation to base portion 64 and includes a pair of recesses for accommodating wear plates 76 (FIGS. 1 and 4) which combine with the plate member 74 to provide a surface 78 against which the lower wall of tubing T and T' is pressed into abutment by clamping blocks 32. The base portion 64 of the left hand welding die 18' is connected to one of the terminals of the secondary windings of a transformer 80 indicated by dotted lines in FIG. 1 and the other terminal of the secondary windings is connected to the base portion 64 of right hand die 18 by a flexible strip 82 of conductive material such as copper which is of sufficient length to allow the carriage member 14 to be moved along the tracks 16. The particular embodiment illustrated in the drawings employs a transformer which reduces a primary windings input of 800 amps at 220 volts A.C. to a secondary windings output of 44,000 amps at 4 volts A.C., it being understood, however, that the electrical requirements may vary with any particular apparatus and it is only necessary that the current supplied be of sufficient magnitude to raise the temperature of adjacent tubing end portions to the plastic range during the butt welding operation as will be described in further detail below.

To move the carriage 14, an extended lever element 84 is provided which is pivoted intermediate an extended arm portion 86 and a short link portion 88 about a shaft 90 fixed to the bed plate 10; the link portion 86 is pivotally joined at its end to a connecting link 92 by pin member 94 which, in turn, is pivotally connected to a member 96 which is fixed to carriage 14 whereby a toggle linkage is provided for moving the carriage 14 by manipulating the lever 84. The force applied to carriage 14 is considerable by virtue of the mechanical advantage obtained from the different lengths of the extended arm portion 86 and the link portion 88 of the lever 84. If desired, the mechanical linkage for moving the carriage 14 could be replaced by conventional hydraulic equipment or other similar equipment. The lever 84 also has an electrical switch 98 located adjacent the extended end of arm portion 86 which is connected (not shown) to control selectively the power input to the primary windings of transformer 80 so that the operator may control the electric power as well as the movement of the carriage 14 from a single location.

Identical guide rail members 100 and 102 extend from the carriage 14 and bed plate 10, respectively, in the direction of the extent of tubing pieces T and T' and consist of a lower plate member 104 joined to an upper plate member 106 by a pair of longitudinally extending beams 108 as shown in FIG. 5. Rail member 102 is held by a plurality of stationary supports 110, only one of which is shown in FIG. 1, spaced along the extent thereof. The rail member 100, however, being attached to movable carriage 14, is slidably supported on three rollers 112, 114 and 116 journaled in stationary supports 118 also at locations spaced along the extent thereof, one of which is shown in FIG. 1; rollers 112 and 114 are journaled on horizontal axes for abutment with the top and bottom surfaces of lower plate 104, and roller 116 is journaled on a vertical axis for abutment with the sides of lower plate 104 as shown in FIG. 5.

Each rail member 100 and 102 carries a tubing support arrangement generally indicated by reference numeral 120 composed of an end stop member 122 movable on casters 124 located in a block 126 having L-shaped members 127 connected thereto by screws 128 which extend below the bottom surface of upper plate 106 for slidably retaining the end stop member 122 thereon. A pin 130 is positioned in a vertical bore 132 in block 126 for cooperation with a series of spaced apertures 134 in the upper plate 106 whereby the end stop member 122 can be selectively located along the upper plate 106 by inserting pin 130 in any of the spaced apertures 134; and a screw 136 is located in threaded bore 138 in block 126 and extends toward a vertical wall portion 140 of tubing support piece 142 which is mounted on casters 144 and has L-shaped retaining members 146 similar to those of end stop member 122; while an upright wall 148 and flat surface 150 provide a seat for the remote ends of the tubing T and T'. With this arrangement of elements, tubing of varying lengths can be supported by using the pin 130 as a coarse adjustment and the screw 136 as a fine adjustment for locating correctly the tubing support piece 142 at the remote end of the tubing. In addition, the L-shaped retaining members 146 of support piece 142 are slightly spaced from the vertical side walls of upper plate 106 as indicated by reference numeral 152 in FIG. 4 to permit limited movement of support piece 142 in a horizontal plane as indicated by arcs $a$ and $a'$ whereby the upright wall 148 can be adjusted for flush abutment with the face of a remote end of tubing which is slightly canted with respect to a transverse plane through the tubing at its remote end.

With the elements arranged in the aforementioned manner, one piece of tubing T' is placed on the stationary portion of the machine with one end thereof supported by surface 78 of welding die 18' and the other end supported on tubing support piece 142 which is adjusted for flush abutment thereat in the aforementioned manner. The carriage 14 is moved to its furthest right-hand position and tubing T' is positioned on welding die 18 in a manner similar to tubing T. The two pieces of tubing T and T' are then aligned lengthwise by hand with the facing end portions of the tubing adjacent and with sides of equal dimension paired. Handle pieces 42 are then pulled down so that the clamping blocks 32 exert sufficient force to hold the pieces of tubing T and T' in their aligned positions and the operator energizes the transformer 80 by closing switch 98. The adjacent end portions of the pieces of tubing T and T' are then moved into abutment by manipulating lever 84 and an alternating electric current is established which flows from the positive side of the secondary windings of the transformer, through one of the welding dies, for example 18', the adjacent end portion of tubing T' to the adjacent end portion of tubing T, welding die 18, flexible strap 82, and back to the negative side of the secondary windings of transformer 80. This flow path, of course, would be reversed on alternating cycles of the A.C. input. The unique die structure directs the flow of current with respect to the rectangular cross-section of the tubing end portion, in a manner to be described in further detail below, to distribute it with substantial uniformity through the cross-section which causes substantially uniform heating of the adjacent tubing end portion. By manipulating the lever element 84 to move carriage 14 and tubing T with respect to tubing T', the amount of current flowing between the adjacent end portions can be controlled to raise evenly the heat along a length of about 2″ at each adjacent end portion of the tubing T and T' until the temperature thereof reaches the plastic range at which time the operator discontinues the current flow by opening switch 98 and moves the lever arm quickly to the left as seen in FIG. 1 causing the carriage 14 and tubing T to be moved toward tubing T' by a force of about 30,000 pounds to upset the adjacent ends thereof and the weld is made. In welding rectangular tubing which, for example, is 4 inches square with a thickness of ¼ inch, the initial heating cycle is about 15 seconds, followed by a short 3 or 4 second cycle of causing high arcing across the adjacent end portions by adjusting the gap therebetween to assure an adequate temperature thereof at upset, and the carriage 14 is moved a distance of about 1½ to 2 inches. After the weld is made, the clamping blocks 32 are raised by handles 42 and the welded tubing is removed for finishing by other apparatus, as for example the broaching, straightening and stress relieving apparatus described in applicants' copending application, Ser. No. 378,230, filed June 26, 1964.

By virtue of the structure of the welding dies 18 and 18', the current flowing therethrough is caused to divide and flow through the leg portions 66 of bifurcated member 62 just prior to its being introduced, for example, to the adjacent end portion of tubing T' so that the current flow will be introduced from plural flow paths, and just subsequent to the current being withdrawn from the adjacent end portion of tubing T so that the current flow is withdrawn through plural flow paths. It has been determined that this dividing and recombining of the current flow through the welding dies 18 and 18' substantially alters the flow of current between the adjacent end portions of tubing T and T' with respect to that which results simply from introducing and withdrawing the current simultaneously at the entire abutting area of the tubing wall by a welding die which does not divide the current. In the latter case, the current flow between adjacent end portions is concentrated substantially at the faces of the tubing walls which abut the surfaces of the welding dies thereby causing non-uniform heating of the tubing end portions resulting in the abutting portions of the lower walls of the tubing reaching the plastic range and frequently separating from the rest of the tubing before the upper walls reach the plastic range. Consequently, the weld is non-uniform, extremely weak and requires some additional welding operation, for example, stick welding, to render the welded tubing suitable for any structural application. When the current flow was divided in the welding dies as provided by the present invention, however, the current flow across the adjacent end portions of tubing T and T' was found to be substantially uniformly distributed through the cross-section thereof causing uniform heating of the end portions; in fact, use of the welding die structure of the present invention with rectangular tubing pieces T and T' having an abutting surface of smaller width than the surfaces 78 of dies 18 and 18' actually resulted in the top wall of the tubing end portion becoming red hot slightly before the bottom wall abutting the surfaces 78 of the welding dies 18 and 18'. The reason for this phenomenon is not completely understood, however, it is believed that by dividing the current flow, it is introduced to and withdrawn from the rectangular tubing cross-section at the bottom corners thereof and in opposite directions causing the current to seek a path of less resistance through the side and top walls of the tubing. When particularly large pieces of tubing are used which have an abutting surface slightly larger in width than the surface 78 of the dies 18 and 18', it was observed that the bottom wall of the tubing became red hot slightly before the top wall which seems to indicate that the opposed direction of the current flow in the case of the smaller piece may be the cause of the upper wall heating faster. In either case, however, the delay between the heating of the upper or bottom wall and the remaining walls was so slight as to be inconsequential and the divided flow in the die structure resulted in a heating cycle causing substantially uniform heating of the adjacent end portion of tubing T and T'.

Because the compressive force for upset is applied at the remote ends of tubing T and T' by tubing supports 120, the clamping force applied at the clamping blocks 32 need only be of sufficient magnitude to hold the tubing T and T' in place and to flatten any bulge in the bottom wall of the tubing T and T' adjacent surface 78 of the dies 18 and 18' whereas if the compressive force were applied through the clamping blocks 32, there would be a danger of distorting the hollow tubing T and T' since the clamping force is applied at the adjacent ends thereof and would be at its highest at upset when the tubing end portions are very susceptible to distortion because of the magnitude of the temperature thereof.

The present invention has been described in detail above for purposes of illustration only and is not intended to be limited by this description or otherwise except as defined in the appended claims.

We claim:

1. A method of welding two pieces of rectangular carbon steel tubing endwise which comprises the steps of substantially aligning said pieces lengthwise with the facing end portions thereof adjacent and with like sides paired, establishing an electric current between a source and ground which flows from one of said adjacent end portions to the other and which is of sufficient magnitude to raise the temperature thereof to the plastic range, while introducing said current to one of said adjacent end portions from plural flow paths and withdrawing said current from the other of said adjacent end portions through plural flow paths to distribute the flow of said current with substantial uniformity through said cross-section and thereby cause substantially uniform heating of said adjacent end portions, discontinuing said current flow when the temperature of said adjacent end portions has reached the plastic range, and applying a compressive force directed lengthwise of said pieces to upset said adjacent end portions.

2. A method of welding as defined in claim 1 and further characterized in that said compressive force is applied at the remote ends of said pieces.

3. A method of welding two pieces of rectangular carbon steel tubing endwise which comprises the steps of substantially aligning said pieces lengthwise with the facing end portions thereof closely adjacent and with like sides paired, establishing an electric current flow between said adjacent end portions of sufficient magnitude to raise the temperature thereof to the plastic range by introducing said current flow at one side of one of said adjacent end portions and withdrawing said current flow at the paired side of the other piece, while dividing said current flow just prior to said introduction thereof so that it is introduced to said one side of one of said adjacent end portions from plural flow paths and recombining said current flow just subsequent to said withdrawal thereof so that it is withdrawn through plural flow paths to distribute the same with substantial uniformity through the rectangular cross-section of said adjacent end portions and thereby cause substantially uniform heating of said adjacent end portions, discontinuing said current flow when the temperature of said adjacent end portions has reached the plastic range, and applying a compressive force directed lengthwise of said pieces to upset said adjacent end portions.

4. Resistance welding apparatus for joining the ends of two pieces of rectangular carbon steel tubing comprising means for supporting said two pieces of tubing aligned lengthwise with the facing end portions thereof adjacent and with like sides paired, said supporting means including a pair of welding dies having surface portions for abutment with corresponding sides of said pieces of tubing near the faces of said adjacent end portions, respectively, and clamping members for pressing said pieces of tubing against said surface portions, said welding dies being selectively connected to sources of opposite electrical potential, respectively, whereby an electric current can be established therebetween which flows through said dies and from one of said adjacent end portions to the other, said dies including means for introducing said current to one of said adjacent end portions from plural flow paths and withdrawing said current from the other of said adjacent end portions through plural flow paths to distribute the flow of said current with substantial uniformity through said cross-section and thereby cause substantially uniform heating of said adjacent end portions, and selectively operable means for moving one of said pieces of tubing toward the other to control the current flow between said adjacent end portions by adjusting the gap between the faces thereof and to apply a compressive force directed lengthwise of said pieces to upset said adjacent end portions when said current flow has raised the temperature thereof to the plastic range.

5. Resistance welding apparatus as defined in claim 4 and further characterized in that each of said welding dies consist of a bifurcated member having a base portion connected to one of said opposite sources and having leg portions extending therefrom with the extended ends thereof in spaced relation to define a void therebetween which extends in the direction of the tubing alignment, and a plate member connected across said extended ends in spaced relation to said base portion and presenting said surface portion for supporting a piece of tubing whereby the flow of current between said supported piece of tubing and said source will divide and flow through said leg portions.

6. Resistance welding apparatus as defined in claim 4 and further characterized in that said supporting means includes a stationary bed plate apparatus having one of said welding dies and its associated clamping member attached thereto, a carriage member mounted on said bed plate apparatus for movement parallel to the direction of the tubing alignment and having the other of said welding dies and its associated clamping member attached thereto, and end stop members located on said bed plate apparatus and said carriage, respectively, for abutment with the remote ends of said pieces of tubing, and in that said selectively operable means includes a lever element pivoted with respect to said bed plate apparatus and a toggle linkage connecting said lever to said carriage member whereby said lever can be manipulated to slide said carriage member relative to said bed plate and thereby move one of said supported pieces of tubing relative to the other in the direction of alignment thereof so that said compressive force is applied to said pieces of tubing at said remote ends thereof by said end stop members.

7. Resistance welding apparatus as defined in claim 6 and further characterized in that each of said end stop members includes a pair of cooperating elements slidably mounted on a stationary rail element extending in the direction of the tubing alignment and having apertures therein spaced along said extent, one of said cooperating elements including a pin member mounted thereon so as to be selectively insertable in any of said spaced apertures and having an adjustably extensible member extending toward the other of said cooperating elements, said other cooperating element presenting a first surface portion thereof for abutment with said extensible member and a second surface portion for abutment with remote end of the associated piece of tubing whereby said pin member provides a coarse adjustment and said adjustably extensible member provides a fine adjustment for locating said second surface portion at the remote ends of tubing having different lengths, and said other cooperating element further includes means permitting limited movement thereof in a plane transverse to its longitudinal direction of movement whereby said second surface portion can be adjusted for flush abutment with the face of a remote end of tubing which is slightly canted with respect to a transverse plane through said tubing at said remote end.

References Cited
UNITED STATES PATENTS

| | | | |
|---|---|---|---|
| 1,525,626 | 2/1925 | Taylor | 219—161 X |
| 3,166,665 | 1/1965 | Neukom et al. | 219—104 |

RICHARD M. WOOD, *Primary Examiner.*

B. A. STEIN, *Assistant Examiner.*